United States Patent [19]

Hart et al.

[11] 4,138,505

[45] Feb. 6, 1979

[54] NUTRIENT COMPOSITIONS DERIVED FROM ANIMAL BLOOD SOLIDS AND PROCESS FOR PRODUCING SAME

[75] Inventors: James R. Hart, Meridian; Patrick D. Brown, Boise, both of Id.

[73] Assignee: Blue Wing Corporation, Boise, Id.

[21] Appl. No.: 736,411

[22] Filed: Oct. 28, 1976

[51] Int. Cl.$^2$ .......................... A23K 1/04; A23L 1/31
[52] U.S. Cl. ..................... 426/573; 426/601; 426/647; 426/92; 426/98; 426/807
[58] Field of Search ............... 426/2, 1, 92, 98, 573, 426/574, 647, 657, 807, 601, 656

[56] References Cited

U.S. PATENT DOCUMENTS

| 155,517 | 9/1874 | Huch | 426/807 X |
|---|---|---|---|
| 1,673,964 | 6/1928 | Atwood | 426/647 X |
| 2,631,937 | 3/1953 | Buss | 426/1 |
| 3,137,631 | 6/1964 | Soloway | 426/98 X |
| 3,352,685 | 11/1967 | Hess | 426/647 X |
| 3,876,803 | 4/1975 | Stephan et al. | 426/573 X |
| 4,007,284 | 2/1977 | Goryaev et al. | 426/647 X |

Primary Examiner—Robert A. Yoncoskie
Attorney, Agent, or Firm—Richards, Harris & Medlock

[57] ABSTRACT

Improved nutrient compositions derived from animal blood solids by the process of maintaining or heating an aqueous medium containing at least 10 weight percent blood solids to a temperature in the range of from about 20 degrees C to about 60 degrees C, adjusting the pH of the heated aqueous medium to a level ranging from 9 to about 13 to form a blood solids gel, and thereafter recovering the gel. Lipid materials can also be encapsulated within the nutrient compositions of the invention.

20 Claims, No Drawings

NUTRIENT COMPOSITIONS DERIVED FROM ANIMAL BLOOD SOLIDS AND PROCESS FOR PRODUCING SAME

BACKGROUND OF THE INVENTION

This invention relates to a process for producing nutrient compositions from animal blood. In one aspect, this invention relates to a process for producing feed supplements containing blood solids and other proteinaceous materials. Furthermore, this invention relates to a process for producing feed supplements for ruminant animals comprising nutrient lipids microencapsulated in alkaline-treated blood solids which, when ingested by a ruminant, pass through the rumen of the animals and are assimilated within the abomasum and lower gut of the animal.

Animal blood obtained in a typical slaughter house operation is either dried to form blood meal or is expelled as effluent. More specifically, liquid blood obtained as a by-product in slaughter house operations is a low value material that is often dumped by some smaller meat packers because they have no use or no market for the material. Larger meat packing facilities have dryers to dry the blood to form a meal which is sold mainly as a fertilizer or animal feed stuff. In general, the blood meal is processed into a dry form on or near the slaughter house premises. Typically, blood is collected in holding vessels and periodically, when a sufficient quantity is collected, it is subjected to one of several possible heating processes which in effect drives the volatile constituents therefrom and thus the blood solids are recovered. This is conventionally accomplished in a batch-type blood cooker, a ring dryer or a spray drying operation. These various drying processes utilize relatively large quantities of energy and produce obnoxious odors when released into the atmosphere and surrounding environment. In addition, refrigeration of the blood may be required in the case of some spray drying operations. Substantial quantities of the nutrients in the blood can be lost through biodegradation which may occur during typical storage and transit conditions. Substantial degradation of the nutrient value of blood solids is typical when the blood is exposed to the high temperatures associated with blood cooker operations. Thus, a more efficient process for utilization of blood, fat and collagen obtained from slaughter house operations is needed, i.e., a method of producing blood, fat and collagen into a usable and thus salable commodity is needed which can be carried out without an undue expenditure of energy and without polluting the environment with obnoxious odors or effluents.

Furthermore, it is desirable to develop nutrient feed stuffs for animals which contain effective and nutritional amounts of nutrient lipids. Earlier researchers have found that it is extremely difficult to feed large quantities of lipid to ruminant animals, i.e., quantities of lipid greater than 4 to 6%. Specifically, the ruminant animal has a multi-gastric system with a first stomach known as a rumen wherein bacteria generally known as microflora are present. These microflora have the ability to break down proteins and lipids, among other things, and hydrogenate unsaturated lipids. Therefore, a significant portion of the unsaturated lipid contained in typical ruminent feeds is hydrogenated in the rumen by the microflora and is subsequently assimilated by the animal as saturated fat. Additionally, the rumen has a low tolerance to feeds containing high concentrations (4 to 6%) of either saturated or unsaturated lipids. This low tolerance produces severe gastric upset when feeds containing high concentrations of unprotected lipids are ingested. For example, when large quantities of dietary lipids are fed to ruminants over and above the 4 to 6%, the ruminant's consumption of total feed intake is typically reduced bringing about a dietary situation wherein there is not enough caloric intake to provide for effective net energy production and in some cases, no energy maintenance of the animal. In addition, digestive disturbances occur because of the lipids floating on the liquid in the rumen and the ruminant will drastically reduce its consumption until it has digested the lipid in the rumen. Furthermore, when such lipids are unsaturated, the rumen's microflora will hydrogenate most of the same and little of the unsaturated lipid will become incorporated into the ruminant's meat or milk.

Several processes have been proposed for encapsulating proteinaceous and lipid materials, in order to effect bypass of such materials through the rumen of the ruminant animal. For example, U.S. Pat. Nos. 3,619,200 and 3,829,564 disclose such processes. Particularly interesting is that process disclosed in U.S. Pat. No. 3,619,200, issued to Ferguson et al. and entitled "Method and Food Composition for Feeding Ruminants". The Ferguson et al. reference states that proteinaceous feed can be protected from breakdown within the rumen of a ruminant animal by modification of the protein itself, by application of a protective coating, or by a combination of the modification of the protein and the protective coating. One particular method set forth is the formation of a protective coating of a formaldehyde-protein complex.

Recently, a process has been developed which encapsulates nutrient lipids in a protective protein-aldehyde complex coating. This process is disclosed in U.S. Pat. No. 3,925,560, issued Dec. 9, 1975. The protein-aldehyde coating covering the lipid is not susceptible to breakdown in the rumen, but is susceptible to breakdown in the abomasum and lower gut. This process includes finely dividing the lipid material into discrete particles or globules and forming an aqueous emulsion or dispersion of finely divided lipid and a proteinaceous material. The aqueous emulsion can then be reacted with an aldehyde such that the finely divided lipid particles are encapsulated in a protein-aldehyde complex. The emulsion is treated with aldehyde and dried to form a coated particle solid.

Although the above mentioned processes have been successful in producing a feed supplement resistant to rumen microflora, new methods for producing such feed supplements are constantly being sought, especially processes employing waste materials which have little or no value. It is to such a feed supplement and process for producing same that the invention is directed.

SUMMARY OF THE INVENTION

According to the invention, an improved process for producing nutrient compositions derived from animal blood solids is provided which comprises maintaining or heating an aqueous medium containing at least about 10 weight percent blood solids to a temperature in the range of from about 20° C. to about 60° C., adjusting the pH of the heated aqueous medium to a pH level in the range of from about 9 to about 13 to form a blood solids gel, and thereafter recovering the gel. Nutrient lipids, assimilable by the animal to which it is fed, and/or other proteinaceous materials, can be incorporated within the resulting alkaline treated blood solids gel by admixing such constituents into the aqueous medium. The gel products produced from animal blood solids can be comminuted and dried to a particulate feed composition.

In accordance with one embodiment of the subject invention, the above novel compositions are produced by initially heating an aqueous medium containing at least about 10 weight percent blood solids to a temperature in the range of from about 20° C. to about 60° C., or maintaining the aqueous medium within that temperature range, adjusting the pH of the heated aqueous medium containing the blood solids to a pH level of from about 8 to about 11, admixing an effective amount of a lipid material into the heated aqueous medium to provide a weight ratio of the lipid material to the blood solids in the range of from about 0.1:1 to 6:1, respectively, to provide a resulting dispersion, and adjusting the pH of the resulting dispersion to a level in the range of from about 11.7 to about 13, thus facilitating formation of a gel. Thereafter, from about 0.1 to about 6 weight percent of an aldehyde is dispersed into the gel to react with the alkaline-treated blood solids gel. The aldehyde treated gel can thereafter be comminuted and, if desired, dried to a particulate composition. Additional proteinaceous material can be incorporated into the feed supplement by admixing the proteinaceous material into the heated aqueous medium prior to the incorporation of the nutrient lipid material. Further, from about 0.1 to 6 weight percent of an aldehyde can be incorporated into the aqueous medium prior to heating same.

In accordance with another aspect of the subject invention, the above novel compositions are produced by admixing from about 0.1 to about 6 percent of an aldehyde, based on the amount of blood solids, with an aqueous medium containing at least 10 weight percent blood solids, maintaining or heating the aldehyde treated aqueous medium to a temperature in the range of from about 20° C. to about 60° C., and thereafter admixing into the heated medium an effective amount of an alkaline constituent to provide a heated aqueous medium having a pH level in the range of from about 11.7 to 13 and thereby form an alkaline-treated blood solids-aldehyde gel. The gel so produced can be comminuted and, if desired, dried to a particulate composition. From about 0.1 to 6 percent, by weight, based upon the weight of the gel of an additional amount of the aldehyde can be dispersed into the gel to improve its physical properties. Further, nutrient lipids and/or other proteinaceous materials can be incorporated within the alkaline-treated aqueous medium.

In accordance with still another aspect of the subject invention, an aqueous medium containing at least about 10 weight percent blood solids is admixed with from about 0.1 to about 6 weight percent, based on the amount of blood solids, of an aldehyde to form an aldehyde treated aqueous medium, heating the aldehyde treated aqueous medium to a temperature in the range of from about 20° C. to about 60° C., or maintaining it within that range, contacting the heated aldehyde treated aqueous medium with an effective amount of an alkaline constituent to provide an aqueous medium having a pH level in the range of from about 7 to about 9, maintaining the resulting pH adjusted aldehyde treated aqueous medium at a temperature in the range of from about 20° C. to 60° C. for a period of time effective to allow partial denaturation of the blood solids, incorporating into the aqueous medium containing the partially denatured blood solids an effective amount of a lipid material to provide a ratio of lipid material to blood solids in the range of from about 0.1:1 to about 6:1, respectively, adjusting the pH of the lipid containing medium to a level in the range of from about 11.7 to about 13 and forming an alkaline treated blood solids-aldehyde gel. The gel so produced can be comminuted and dried to a particulate composition. Other proteinaceous materials can be incorporated into the gel.

In still another aspect of the invention, an aqueous medium containing at least 10 weight percent blood solids can be stored without substantial biodegradation of the blood nutrients by the incorporation therein of from about 0.1 to 6 percent by weight, based on the amount of blood solids present in the aqueous medium, of an aldehyde.

In accordance with still another aspect of the invention, novel supplements containing nutrient lipids which are assimilable by a ruminant animal can be fed to the animal in quantities in excess of that which such animals normally receive, 4 to 6 percent, and the animal will assimilate the lipid and no digestive disturbances will occur.

DETAILED DESCRIPTION OF THE INVENTION

The subject invention makes possible a more efficient utilization of animal blood recovered from the kill floor of a slaughter house. Such can readily be accomplished by heating an aqueous medium containing at least 10 percent blood solids to a temperature in the range of from 20° C. to about 60° C. and thereafter adjusting the pH level of the heated aqueous medium to a pH level of from about 9 to about 13 to form a gel containing the blood solids. The gel so formed can be comminuted and employed as a feed supplement in the gel form or can be dried using conventional agricultural-type drying equipment to form a particulate nutrient composition. Nutrient lipids, assimilable by the animal to which the feed composition is fed, and/or other proteinaceous materials, can be incorporated within the alkaline treated blood solids gel by admixing either or both of such constituents into the aqueous medium.

It should be noted that the term "heating" as used herein in connection with a temperature range includes simply maintaining the aqueous medium within the stated temperature range. Thus it is apparent that in many cases ambient conditions will be sufficient to maintain the aqueous medium within the stated temperature range of from about 20° C. to about 60° C. In such cases actually heating the aqueous medium by supplying an additional heat source would be unnecessary.

Any suitable alkaline constituent can be employed as the pH adjusting agent provided such alkaline constituent initiates and aids in the formation of the blood solids containing gel. Desirable results can be obtained when the alkaline constituent is an alkali metal hydroxide, such as sodium hydroxide, potassium hydroxide, lithium hydroxide, an alkaline earth metal hydroxide, such as calcium hydroxide, and mixtures of same. The amount of alkaline constituent employed can vary widely, such being dependent to a large extent upon the initial pH of the aqueous medium containing the blood solids.

The term "blood solids", as used herein, is understood to be the solid material which results from the drying of a representative sample of animal blood recovered from a slaughter house where the drying procedure is carried out at a temperature of about 105° C., plus or minus 5° C., to remove water present in the blood sample. Generally, the blood solids include blood proteins, salts, cellular constituents and traces of tissue inherent in the animal blood recovered in the slaughter house.

Animal blood is collected in large quantities during killing operations in meat packing plants, slaughter houses and the like. The blood so collected can vary in blood solids content depending on the amount of dilution it receives from the wash water used to clean the kill floor. A blood solids content of from about 10% to about 21% is normal for the aqueous blood medium which is collected under these conditions. As is evident, the concentration of blood solids within the aqueous mixture can readily be adjusted, either by concentrating same or by diluting same, and such will depend to a large extent upon the particular use for which the aqueous blood solids containing medium is employed. In preparing the novel feed supplement compositions according to the process of the present invention, it is generally preferred that the blood solids content of the aqueous medium be at least 10%, preferably from about 16 to about 21%.

The term "gel" as used herein is to be understood to mean a cross linked three dimensional network of fibres formed by the blood solids which bind water therein. When a lipid material is incorporated within the alkaline treated blood solids the network of fibres formed by the blood solids encapsulates the lipid material. When additional proteinaceous materials are employed such incorporate themselves within the fibrous network of the alkaline treated blood solids. The gels produced in accordance with the process of the present invention can readily be comminuted and thereafter employed as a feed supplement in the comminuted gel form or the comminuted gel can readily be dried to a particulate composition.

In accordance with the process for producing a nutrient composition from animal blood of the subject invention, an aqueous medium containing at least about 10 weight percent blood solids, preferably from about 16 to 21 weight percent blood solids, is heated to a temperature in the range of from about 20° C. to about 60° C. After the aqueous medium has been heated to the desired temperature an effective amount of an alkaline constituent is admixed with the heated aqueous medium to adjust the pH of same to a pH level in the range of from about 9 to about 13, preferably from about 11.7 to 12.5. Once the pH of the aqueous medium has been adjusted to the specified range, a gel containing the blood solids begins to form. After the formation of the gel is completed, the gel can be recovered and comminuted and employed as a feed supplement, or the gel can be dried at a temperature in the range of from about 20° C. to about 200° C. to produce a coarse but uniform particle size particulate composition.

In producing animal feed supplements from such blood solids, it is often desirable to incorporate other proteinaceous material into the aqueous medium containing the blood solids and thus the resulting feed composition. When it is determined that such additional proteinaceous materials are desired the proteinaceous materials are incorporated into the heated aqueous medium. The amount of proteinaceous material employed can vary widely but it is generally preferred that it be used in amount at least equivalent to the amount of blood solids initially present in the aqueous medium. Desirable results can be obtained when the proteinaceous material is incorporated into the heated aqueous medium in an amount of from about 100% to 500%, based on the weight of the blood solids present therein. Further, any suitable proteinaceous material which can readily be dispersed within the heated aqueous medium can be employed. Typical of such proteinaceous materials are casein, soy meal, sunflower meal, safflower meal, bran, rice hulls, and mixtures of same.

Nutrient lipids can also be incorporated into the feed supplements of the present invention and such lipid constituents are encapsulated within the alkaline treated blood solids products so that the lipid is more resistant to digestion in the rumen of the animal and thus can pass therethrough and be digested in the abomasum and lower gut of the animal. When incorporating a nutrient lipid into the feed supplement, the nutrient lipid is admixed with the heated aqueous medium containing the blood solids prior to contacting the heated medium with the alkaline constituent. The nutrient lipid can be admixed with the heated aqueous medium by any suitable means such as by homogenation or forming an emulsion under emulsion forming conditions. Preferably the lipid is dispersed within the heated aqueous medium in globules having a size of less than about 0.1 millimeter and most preferably of a size in the order of 0.5 to 0.10 microns. The nutrient lipids which can be used in the scope of this invention can comprise any nutrient lipid which is assimilable by the animal to which it is fed. In treating ruminant animals, for example, the nutrient lipids which can be used include saturated and unsaturated vegetable or animal fats. Examples of suitable materials include vegetable oil, endogeneous in or derived, for example, from soy beans, peanuts, safflowers, sunflowers, cotton seed, maize, rape, and the like, or animal fats or oils derived from non-ruminants such as fish, fowl or pig, or from ruminant animals. The fats and oils do not necessarily have to be separated from the flesh of fish, fowl, pig or ruminant animals or in the case of oil seeds, extracted. After proper comminution, the entirety of such materials can be utilized in some cases.

In processing solid fat, such as unrendered animal fat, the fat is initially melted by heating to a temperature above the melting point of the fat. Thereafter, the melted fat is blended with the aqueous medium containing the blood solids which has previously been heated to a temperature in the range of from about 40° C. to about 60° C. and the aqueous medium and melted fat are blended together and homogenized. By employing such unrendered fat in the process of the present invention to provide the novel feed supplement, one can effect savings in the cost of rendering of the fat. Furthermore, the collagen which is contained within the low value fat will be incorporated into the feed supplement thus increasing the value of the material.

When utilizing liquid lipid, such as vegetable oil, the lipid and the heated aqueous medium containing the blood solids can be blended together at a temperature in the range of from about 20° C. to about 60° C. to form a uniform dispersion or emulsion of the lipid globules within the heated aqueous medium.

In general, sufficient lipid is utilized so that a weight ratio of lipid to blood solids is maintained in the range of from about 0.1:1 to about 6:1, respectively. Thus, the resulting dispersion or emulsion of the aqueous medium contains a lipid content in the range of from about 5 to about 20 percent by weight and the dried food supplement produced will have a lipid content in the range of up to about 75% by weight thereof. If desired, additional ingredients can be incorporated into the food supplement, such as vitamins, minerals and the like without adversely affecting the properties of the food supplement.

The feed supplements produced from animal blood solids according to the present invention can also be produced by initially heating an aqueous medium containing at least about 10 weight percent blood solids to a temperature in the range of from about 20° C. to about 60° C., adjusting the pH of the heated aqueous medium containing the blood solids to a pH level in the range of from about 8 to about 11, admixing an effective amount of a lipid material into the heated aqueous medium to provide a weight ratio of lipid material to the blood solids in the range of from about 0.1:1 to about 6:1, respectively, and to produce a resulting dispersion, and thereafter adjusting the pH of the resulting dispersion to a pH level in the range of from 11.7 to about 13 so as to form the blood solids containing gel. From about 0.1 to about 6 weight percent of an aldehyde can be dispersed into the gel to react with the alkaline treated blood solids gel to improve its physical properties. The aldehyde treated gel can thereafter be comminuted and, if desired, dried to a particulate composition. Additional proteinaceous materials, as hereinbefore described, can be incorporated into the feed supplement by admixing an effective amount of such proteinaceous materials, generally from about 100–500% by weight, based upon the amount of blood solids present in the aqueous medium, into the heated aqueous medium containing such blood solids. When desired, an additional amount of an aldehyde, from about 0.1 to about 6 weight percent, based on the amount of blood solids can be admixed with the aqueous medium prior to heating same. When employing such a procedure a product results from the reaction of the aldehyde and the blood solids which can readily protect the feed supplement from degradation in the rumen of the animal.

The aldehyde which can be employed to improve the physical characteristics of the alkaline treated blood solids gel and thus the resulting dried product can be any aldehyde containing at least one aldehyde group which is available for reaction with the blood solids. While any aldehyde meeting the above requirements can be employed, especially desirable results can be obtained when the aldehyde employed is formaldehyde, acetaldehyde, or glutaraldehyde. Because of the economics and availability of formaldehyde, such is the most suitable.

Feed supplements having improved resistance to degradation in the rumen of a reminant animal can also be produced containing blood solids according to the process of the present invention. In such a process an aqueous medium containing at least about 10 weight percent blood solids is admixed with from about 0.1 to about 6 weight percent of an aldehyde, based upon the amount of blood solids present in the aqueous medium. The aldehyde employed can be any suitable aldehyde as previously described, namely one which has at least one aldehyde group which is available for reaction with the blood solids. The aldehyde treated aqueous medium is then heated to a temperature in the range of from about 20° C. to about 60° C. The heated aldehyde treated aqueous medium is then contacted with an effective amount of an alkaline constituent, as previously defined, to provide an aqueous medium having a pH level in the range of from about 11.7 to about 13 and thus form a gel of the alkaline treated blood solids-aldehyde reaction product.

Nutrient lipids and/or other proteinaceous materials, as hereinbefore defined, can be incorporated into the gel by admixing such constituents into the aldehyde-treated aqueous medium. When incorporating a lipid nutrient into the feed composition, an effective amount of lipid is employed to provide a lipid to blood solids weight ratio in the aqueous medium in the range of from about 0.1:1 to 6:1, respectively. Further, if additional proteinaceous materials are incorporated into the feed composition, such are preferably employed in an amount of from about 100% to about 500%, by weight based on the amount of blood solids present in the aqueous medium. If desired, an additional amount of aldehyde, generally from about 0.1 to about 6 weight percent, based on the weight of the gel, can be dispersed into the gel in either a gaseous or liquid form to improve the physical properties of the gel and thus the particulate composition formed upon drying of the gel. When employing the additional amount of aldehyde to improve the physical properties of the gel the aldehyde is preferably incorporated into the gel prior to comminuting same.

Improved lipid encapsulated feed supplements which will substantially resist degradation in the rumen of a ruminant animal can also be produced containing blood solids according to the process of the present invention. In such a process an aqueous medium can also be produced containing blood solids according to the process of the present invention. In such a process an aqueous medium containing at least about 10 weight percent blood solids is admixed with from about 0.1 to about 6 weight percent of an aldehyde, based upon the amount of blood solids present in the aqueous medium. The aldehyde employed can be any suitable aldehyde as previously described, namely one which has at least one aldehyde group which is available for reaction with the blood solids. The aldehyde treated aqueous medium is then heated to a temperature in the range of from about 20° C. to about 60° C. The heated aldehyde treated aqueous medium is then contacted with an effective amount of an alkaline constituent, as previously defined, to provide an aqueous medium having a pH level in the range of from about 7 to about 9. The resulting pH adjusted aldehyde treated aqueous medium is then maintained at the temperature in the range of from about 20° C. to about 60° C. for an effective period of time to allow partial denaturation of the blood solids. Desirable results can be obtained when the pH adjusted aldehyde treated aqueous medium is maintained under substantially quiescent conditions during the partial denaturation of the blood solids. The time required for the blood solids to commence to denature can vary widely. However, such will normally occur within a time period of from about 1 to about 12 hours. After the blood solids have partially denatured an effective amount of a lipid material, as previously defined, is incorporated into the aqueous solution containing the partially denatured blood solids to provide a ratio of lipid material to blood solids in the range of from about 0.1:1 to about 6:1, respectively. After the lipid material has been thoroughly dispersed or emulsified within the aqueous medium the pH of the lipid containing aqueous medium is then adjusted by the addition of the alkaline constituent to provide a pH level in the range of from about 11.7 to about 13 and thus form an alkaline treated blood solids-aldehyde gel. The gel so produced can be comminuted and dried to a particulate composition. Other proteinaceous materials, likewise as hereinbefore defined, can be incorporated as desired. Such are employed in an amount of from about 100% to about 500%, by weight, based upon the amount of blood solids initially present in the aqueous medium.

It should be noted that the gel produced containing the lipid, blood solids, and/or other proteinaceous material can be employed as a feed supplement, per se, or the resulting gel particles, after being comminuted, can be dried at a temperature in the range of from about 80°-90° C. using conventional drying equipment, such as an agricultural type drier. If desired, an additional amount of aldehyde, generally from about 0.1 to about 6%, based upon the weight of the blood solids, can be dispersed into the gel in either a gaseous or liquid form to improve the physical properties of the gel and thus the particulate composition formed upon drying of the gel. It should be noted that when the additional aldehyde is incorporated into the gel such is preferably done while comminuting the gel.

In normal blood collection procedure at slaughter houses, the blood is collected in vessels, tanks or vats. During this collection process, the blood may stand in the container and thus undergo or become subject to biodegradation. Accordingly, the blood which is used in the scope of the subject invention can be treated with a suitable bacteriostat to retard biodegradation of the blood during storage and prior to processing. Any suitable bacteriostat can be employed, such as the before mentioned aldeyde, alkaline constituents, and mixtures of same, quaternary ammonium salts, organic bacteriostats and the like. Examples of organic bacteriostats are sodium benzoate, phenol and hexachlorophene. When an alkaline constituent is employed as a bacteriostat it is preferred to employ the same alkaline constituent employed as the pH adjusting agent in the before described processes. Examples of these alkaline constituents are the alkali metal hydroxides and the alkaline earth metal hydroxides. When employing an aldehyde as the bacteriostat such is generally employed in an amount of from about 1/10 to 6 weight percent, based upon the amount of blood solids present. It should further be noted that in addition to serving as a bacteriostat, the alkaline constituent is beneficial and helpful in forming an emulsion or dispersion when lipids are incorporated into the blood solids gels in accordance with the novel processes of the subject invention.

Furthermore, while the aldehyde may be replaced by the equivalent bacteriostats disclosed above for purposes of retardation of biodegradation during storage it should be noted that these other bacteriostats are in no way equivalent to and cannot be substituted for the aldehyde to achieve the rumen breakdown resistant qualities of the feed supplements of the subject invention.

In normal slaughter house procedure, the blood may remain on the kill floor for a matter of minutes, allowing sufficient time for the natural blood coagulation process to take place. This may necessitate the slaughter house operators' use of additional water to move the blood from the kill pit to the storage vessel, thereby reducing the weight percent of blood solids in the aqueous medium below the desired level of at least 10 weight percent. In order to reduce the amounts of extraneous water and allow the blood to flow freely into the storage vessel, the blood which is used in the scope of this invention can be treated with a suitable anti-coagulant to retard the clotting process of the blood. Any suitable anti-coagulant may be employed such as EDTA (ethylene-di-amine-tetra-acetic acid) and its salts, citrate ion and the like. It should be further noted that in addition to serving as anti-coagulants, EDTA and citrate ions may also serve as antioxidants in the final product of this process.

The feed supplements produced according to the process of the present invention which contain lipid nutrients encapsulated within the alkaline treated blood solids and/or blood solids-aldehyde reaction product can readily be fed to ruminant animals in effective nutritional amounts, thereby permitting modification of the animal's nutrition, fat, meat and milk production without causing digestive disturbances. Such feed supplements made of alkaline treated animal blood solids and nutrient lipids are substantially resistant to degradation in the substantially neutral pH environment of the rumen of the ruminant animal. Thus, the feed supplement digested by the animal will pass through the rumen and become digested in the abomasum and lower gut of the animal.

In order to more fully describe the present invention, the following examples are set forth. However, it is to be understood that these examples are for illustrative purposes only and are not to be construed as unduly limiting the scope of the present invention.

EXAMPLE 1

Six hundred pounds of liquid blood obtained from a slaughter house which contained about 16 percent by weight blood solids was pumped through a heat exchanger and heated to a temperature of 50° C. The blood so used had been stored in the presence of sodium hydroxide for about three days and had a pH of 8.9. Fifty pounds of tallow which had been heated to its melting point were added to the heated aqueous blood solids-containing medium and the resulting mixture stirred to form a dispersion of the tallow within the aqueous medium. Thereafter, two gallons of an aqueous solution containing four pounds of sodium hydroxide were slowly added to the resulting dispersion of blood solids and tallow until a pH in the range of 12.2–12.5 was achieved. Upon achieving the before mentioned pH value, the blood solids and tallow commenced to gel. The gel so formed was firm but exhibited some surface stickiness.

The gel so produced was then placed on a conveyor and allowed to cool for about one and one-half hours. During and after the cooling period the gel was examined and it was determined that most of the surface stickiness was alleviated. Thereafter, the gel was passed into a conventional rotary agricultural drier and dried at a temperature between 82° C. and 88° C. The resulting product had a coarse, flaky texture.

EXAMPLE 2

A blood solids-containing gel was produced employing substantially the same constituents and procedure as set forth in Example 1. When the gel was obtained it was noted that the gel possessed the same surface stickiness as the gel of Example 1. Four pounds of an aqueous solution containing 37% formaldehyde were admixed into the gel. Within one minute the gel had lost all stickiness and developed a dry crumbly appearance with generally uniform particulate size. The aldehyde treated gel was then placed on a conveyor and immediately passed through a rotary drum drier wherein the gel was dried at a temperature of from about 82° C. to 88° C. The resulting product had a very fine texture and was uniform as to particulate size.

EXAMPLE 3

Two hundred pounds of an aqueous medium containing 16% blood solids and having a pH of 7.4 was pretreated with an aqueous formaline solution containing 37% formaldehyde to provide an aldehyde treated aqueous medium containing 0.87% formaldehyde, based upon the amount of blood solids. The formaldehyde treated aqueous medium was passed through a heat exchanger and heated to a temperature of 40° C. Thereafter, an aqueous solution of sodium hydroxide was admixed with the aldehyde treated aqueous mixture until ammonia gas was detected. Thereafter, fifteen pounds of tallow which had been previously heated to a temperature of 43° C. and was thus in a liquid state was added to the aqueous medium and mixed well for about five minutes to insure that a good dispersion resulted from the addition of the tallow to the aqueous medium. Thereafter, an effective amount of an aqueous solution of sodium hydroxide was admixed into the emulsion until a pH of about 12.5 was obtained and a gel formed. The gel was a firm gel, but possessed surface tackiness. One pound of an aqueous solution containing 37% formaldehyde was added to the gel and dispersed therein. Thereafter, the gel became crumbly and possessed a shiny appearance. The gel was then placed on a conveyor and passed through an agricultural drier operated at a temperature of 82°-88° C. The resulting product had a fine texture and exhibited uniform particle size.

The product was subjected to analysis in both the gel form prior to the addition of the formaldehyde and as a dried product. The results of such analysis are set forth in Table I below:

TABLE I

| Gel Prior to HCHO Addition | Dried Product |
| --- | --- |
| 72.5% H₂O | 22.3% H₂O |
| 27.5% Blood Solids - Tallow | 32.6% Fat (D.M.) |
| 0-5% Protection of Fat | 66.71% Blood Solids (D.M.) |
|  | 0.69% HCHO (D.M.) |
|  | 75-80% Protection of Fat |

EXAMPLE 4

Seven hundred pounds of liquid blood obtained from a slaughter house which contained about 16 percent by weight blood solids was pretreated with seven and one quarter pounds of an aqueous solution containing 37 percent formaldehyde to yield an aqueous medium containing about 2.4% formaldehyde, based upon the amount of blood solids present in the aqueous medium. Thereafter, four hundred pounds of the aldehyde treated aqueous medium was heated to a temperature of about 41° C. by passing same through a heat exchanger. An effective amount of an aqueous solution of sodium hydroxide was added to the heated aqueous mixture to provide a pH of from about 10.0 to 11.0. After the pH of the aqueous medium had been adjusted to the desired range, twenty pounds of liquid tallow, which had been previously heated to 43° C., were added and admixed to the aqueous medium for about 3-5 minutes to insure complete dispersion of the tallow within the aqueous medium. Thereafter, the pH of the resulting dispersion was adjusted to 12.5 by the addition of sodium hydroxide. Upon obtaining a pH of 12.5 a gel began to form. The gel was a firm gel but exhibited some surface stickiness. The gel was allowed to set for 5 minutes and a substantial amount of the stickiness of the gel disappeared. The gel was then broken into small particles by the use of a mixer, placed on a conveyor, and dried at a temperature of 82°-88° C. in an agricultural rotary drum drier. The resulting product was examined and it was noted that the product had a fine texture and a uniform particle size.

The gel so produced, and the dried product, were subjected to analysis and the results of such analysis are set forth in Table II below:

TABLE II

| Gel | Dried Product |
| --- | --- |
| 79.0% water | 26.0% Water |
| 5-10% Protection of Fat | 26.6% Fat (D.M.) |
| 21% Blood Solids-Aldehyde having tallow encapsulated therein | 0.61% Formaldehyde (D.M.) |
|  | 75-80% Protection of Fat |
|  | 72.8% Blood Solids (D.M.) |

EXAMPLE 5

Eight hundred pounds of liquid blood obtained from a slaughter house which contained about 16 percent by weight blood solids and having an initial pH of 7.4 were placed in a primary mix tank and four pounds of an aqueous solution containing 37% formaldehyde were added thereto so that the resulting aldehyde treated aqueous medium contained 1.1% formaldehyde based upon the weight of blood solids present in the medium. The pH of the aldehyde treated aqueous medium was then adjusted to 8.5 by the addition of an effective amount of an aqueous solution of sodium hydroxide. The resulting mixture was well mixed and then allowed to sit over night before further processing. Thereafter, four hundred pounds of the resulting blood mixture was heated to 40° C. by passing same through a heat exchanger. The pH of the heated aqueous mixture was then adjusted to a pH level in the range of 10.1-11.0 by the addition of an effective amount of aqueous solution of sodium hydroxide. Thereafter, twenty-three pounds of of tallow which had been heated to a temperature of 43° C. and thus maintained in a liquid state were added and thoroughly admixed with the aqueous medium for about 3-5 minutes to insure a uniform dispersion of the tallow within the aqueous medium. The resulting dispersion was then contacted with an effective amount of an aqueous solution of sodium hydroxide to provide a pH of 12.5. Upon obtaining the desired pH a gel was formed. The gel was a firm gel but again was sticky on the surface. A portion of this gel was set aside for analysis. The remainder of the gel was contacted with two and one half pounds of an aqueous solution containing 37% formaldehyde resulting in a firm gel which was dry to the touch. The gel then placed in a mixer and with the shearing action of the mixer was reduced to a firm, crumbly uniform gel. The gel was then placed on a conveyor and dried in an agricultural rotary drier at a temperature of 82°-88° C. The dried product had a fine texture and was of a uniform particle size. The product was subjected to analysis, the results of such being set forth hereinafter in Table III.

TABLE III

| Gel Prior HCHO Addition | Gel After HCHO Addition | Dried Product |
| --- | --- | --- |
| 79.4% H₂O | 79.8% H₂O | 30.3% H₂O |
| 0-5% Protection | 25-30% Protection | 12.2% Fat (D.M.) |

TABLE III-continued

| Gel Prior HCHO Addition | Gel After HCHO Addition | Dried Product |
|---|---|---|
| of Fat | of Fat | 0.94% HCHO (D.M.) |
| 20.6% Blood Solids and Tallow | 2.02% Blood Solids, Tallow and Aldehyde | 86.9% Blood Solids (D.M.) 75–80% Protection of Fat |

EXAMPLE 6

Four hundred pounds of liquid blood obtained from a slaughter house which contained about 14 percent by weight blood solids and having a pH of 6.5 were heated to a temperature of about 40° C. Thereafter, an effective amount of an aqueous solution of sodium hydroxide was admixed with the heated aqueous medium to provide a pH of 12.2 within the aqueous medium. Within 3–5 minutes a firm gel had formed, such gel exhibiting a slight surface stickiness. The surface of the gel became more firm upon cooling. The gel so produced was then placed on a conveyor and passed through an agricultural-type rotary drier. The product was dried at a temperature in the range of 82°–88° C. and yielded a coarse, but uniform particle size product.

EXAMPLE 7

The procedure of Example 5 was followed to the formation of the blood solids-containing gel. Once the gel had been formed 1.5 pounds of an aqueous solution containing 37% formaldehyde were dispersed into the gel resulting in a product which was dry and crumbly, such being achieved within about 1 minute after the introduction of the aqueous formaldehyde solution. The formaldehyde treated gel then was placed on a conveyor and passed through a rotary drum drier which dried the gel at a temperature in the range of 82°–88° C. The resulting product had a fine texture and uniform size particles.

The above experiments clearly illustrate the process of the present invention for producing improved feed supplements from an aqueous medium containing blood solids. The data further shows that the physical properties of the gels so produced can be improved by the addition of an aldehyde to the gel, and that such gels result in products having a fine texture and uniform particle size. Further, the data clearly illustrates that when employing the process of the present invention an improved feed supplement composition can be produced having incorporated therein a lipid material which will be substantially resistant to degradation in the rumen of a ruminant animal and thus will be assimilable in the abomasum and lower gut of such animal.

Having thus described the invention, we claim:

1. A process for producing a nutrient composition from animal blood comprising:
   (a) heating an aqueous medium containing at least about 10 weight percent blood solids to a temperature in the range of from about 20° C. to about 60° C.;
   (b) adjusting the pH of the heated aqueous medium to a pH level in the range of from about 8 to about 11;
   (c) admixing an effective amount of a nutrient lipid into the heated pH adjusted aqueous medium to provide a dispersion containing a ratio of lipid to blood solids in the range of from about 0.1:1 to about 6:1, respectively;
   (d) adjusting the pH of the resulting dispersion to a pH level in the range of from about 11.7 to about 13 to form a blood solids-lipid containing gel;
   (e) dispersing from about 0.1 to about 6 weight percent, based upon the weight of the blood solids, of an aldehyde into said gel, said aldehyde being reactive with said blood solids; and
   (f) recovering said gel.

2. The process of claim 1 further comprising the step of comminuting said gel.

3. The process of claim 1 further comprising the step of drying the comminuted gel to form a particulate nutrient composition containing blood solids and nutrient lipid.

4. The process of claim 1 further comprising the step of admixing into the heated aqueous medium from about 100% to about 500% of another animal or vegetable proteinaceous material, based upon the weight of blood solids in said aqueous medium.

5. The process of claim 4 wherein said other proteinaceous material is selected from the group consisting of casein, soy meal, sunflower meal, safflower meal, bran, rice hulls, and mixtures of same.

6. The process of claim 1 further comprising the step of admixing from about 0.1 to about 6 weight percent of said aldehyde into the aqueous medium prior to heating same.

7. The process of claim 6 wherein said aldehyde is selected from the group consisting of formaldehyde, acetaldehyde, and glutaraldehyde.

8. The process of claim 1 wherein said pH is adjusted by admixing an effective amount of an alkaline consituent selected from the group consisting of alkali metal hydroxides, alkaline earth metal hydroxides, and mixtures thereof within said heated aqueous medium.

9. A process for producing a nutrient composition from animal blood containing nutrient lipids which is substantially resistant to degradation in the rumen of a ruminant animal comprising:
   (a) admixing into an aqueous medium containing at least about 10 weight percent blood solids from about 0.1 to about 6 weight percent of an aldehyde, based upon the amount of blood solids present in the aqueous medium, to form an aldehyde treated aqueous medium, said aldehyde being reactive with said blood solids;
   (b) heating the aldehyde treated aqueous medium to a temperature in the range of from about 20° C. to about 60° C.;
   (c) adjusting the pH level of the heated aldehyde treated aqueous medium to a pH level in the range of from about 7 to about 9;
   (d) maintaining said pH adjusted aldehyde treated aqueous medium at a temperature in the range of from about 20° C. to about 60° C. for a period of time effective to allow said blood solids to partially denature;
   (e) dispersing into the aldehyde treated aqueous medium containing the partially denatured blood solids an effective amount of a nutrient lipid to provide a dispersion containing a ratio of lipid to blood solids therein of from about 0.1:1 to about 6:1, respectively;
   (f) adjusting the pH of the resulting dispersion to a level in the range of from about 11.7 to about 13 to form an alkaline treated blood solids gel having incorporated therein said nutrient lipid; and
   (g) recovering said gel.

10. The process of claim 9 wherein said nutrient lipid is a vegetable oil.

11. The process of claim 9 wherein said nutrient lipid is animal fat.

12. The process of claim 11 wherein said dispersion is formed by initially melting said animal fat and thereafter blending the melted animal fat and the heated aldehyde treated aqueous medium together to form said dispersion.

13. The process of claim 11 wherein said animal fat is unrendered fat.

14. The process of claim 9 further comprising the step of comminuting said gel into a particulate nutrient gel composition.

15. The process of claim 14 further comprising the step of drying said comminuted gel at a temperature in the range of from about 20° C. to about 200° C. to form a particulate nutrient composition having said lipid material incorporated within the blood solids-aldehyde reaction product.

16. The process of claim 9 wherein said pH is adjusted by admixing an effective amount of an alkaline constituent selected from the group consisting of alkali metal hydroxides, alkaline earth metal hydroxides, and mixtures thereof.

17. The process of claim 9 further comprising the step of admixing into said aldehyde treated aqueous medium from about 100% to about 500% of another animal or vegetable proteinaceous material, based upon the weight of blood solids in said aldehyde treated aqueous medium.

18. The process of claim 17 wherein said other proteinaceous material is selected from the group consisting of casein, soy meal, sunflower meal, safflower meal, bran, rice hulls and mixtures of same.

19. The process of claim 14 which further comprises the step of incorporating from about 0.1 to about 6% of an aldehyde into said gel prior to comminuting said gel.

20. The process according to claim 19 wherein said aldehyde is selected from the group consisting of formaldehyde, acetaldehyde, and glutaraldehyde.

* * * * *

UNITED STATES PATENT AND TRADEMARK OFFICE
CERTIFICATE OF CORRECTION

PATENT NO. : 4,138,505
DATED : February 6, 1979
INVENTOR(S) : James R. Hart, et al.

It is certified that error appears in the above–identified patent and that said Letters Patent are hereby corrected as shown below:

Col. 7, line 54, change "reminant" to --ruminant--.

Col. 9, line 32, change "aldeyde" to --aldehyde--.

Col. 13, line 6, change "2.02%" to --20.2%--.

Signed and Sealed this

Tenth Day of July 1979

[SEAL]

Attest:

Attesting Officer

LUTRELLE F. PARKER
Acting Commissioner of Patents and Trademarks